(12) United States Patent
Poisel et al.

(10) Patent No.: US 9,678,280 B2
(45) Date of Patent: Jun. 13, 2017

(54) OPTICAL ROTARY TRANSMITTER

(71) Applicant: Georg-Simon-Ohm Hochschule Fur Angewandte Wissenschaften, Nuremberg (DE)

(72) Inventors: Hans Poisel, Nuremberg (DE); Olaf Ziemann, Nuremberg (DE); Alexander Bachmann, Nuremberg (DE); Martin Bloos, Nuremberg (DE); Roman Kruglov, Nuremberg (DE)

(73) Assignee: Venturetec Mechatronics GMBH, Kaufbeuren (DE)

( * ) Notice: Subject to any disclaimer, the term of this patent is extended or adjusted under 35 U.S.C. 154(b) by 0 days.

(21) Appl. No.: 14/439,604

(22) PCT Filed: Oct. 31, 2013

(86) PCT No.: PCT/EP2013/072813
§ 371 (c)(1),
(2) Date: Apr. 29, 2015

(87) PCT Pub. No.: WO2014/068059
PCT Pub. Date: May 8, 2014

(65) Prior Publication Data
US 2015/0316726 A1 Nov. 5, 2015

(30) Foreign Application Priority Data

Oct. 31, 2012 (DE) .................. 10 2012 021 453

(51) Int. Cl.
*G02B 6/36* (2006.01)
*G02B 6/32* (2006.01)
*G02B 6/26* (2006.01)

(52) U.S. Cl.
CPC ........... *G02B 6/3604* (2013.01); *G02B 6/262* (2013.01); *G02B 6/32* (2013.01)

(58) Field of Classification Search
CPC ......... G02B 6/3604; G02B 6/262; G02B 6/32
(Continued)

(56) References Cited

U.S. PATENT DOCUMENTS

| 4,875,756 A | 10/1989 | Estes et al. |
| 4,943,137 A * | 7/1990 | Speer .................. G02B 6/3604 250/227.11 |

FOREIGN PATENT DOCUMENTS

| DE | 19529527 C1 | 10/1996 |
| GB | 2247089 A | 2/1992 |
| WO | WO 2011/137983 A1 | 4/2011 |

OTHER PUBLICATIONS

International Search Report (6 pages) for International Application No. PCT/EP2013/072813, mailing date Jan. 24, 2014.

* cited by examiner

*Primary Examiner* — John M Bedtelyon
(74) *Attorney, Agent, or Firm* — Tarolli, Sundheim, Covell & Tummino LLP; John A. Yirga, Esq.

(57) ABSTRACT

The invention relates to an optical rotary transmitter for transmitting optical signals, comprising a first light coupler (1) that has one or a plurality of first light guides (11) the end faces of which are designed to transmit optical signals and are arranged on a first ring about a central rotational axis Z, a second light coupler (3) that has one or a plurality of second light guides (31) the end faces of which are designed to transmit optical signals and are arranged on a second ring about the central rotational axis Z, a fiber mirror (5) comprising a plurality of third light guides that are arranged between said two light couplers (1,3) and are designed to compensate for the effect, on the transmission of the optical signals, of the two light couplers (1,3) rotating relative to one another, the end faces of the third light guides being designed to transmit optical signals and arranged on a third (Continued)

and fourth ring about the central rotational axis Z. Light inlet/outlet surfaces that are formed by the third and fourth rings are substantially gap-free such that the optical signals can be continuously transmitted without interruption.

16 Claims, 3 Drawing Sheets

(58) Field of Classification Search
USPC .................................................... 385/25, 26
See application file for complete search history.

US 9,678,280 B2

OPTICAL ROTARY TRANSMITTER

CROSS REFERENCES TO RELATED APPLICATIONS

The present application is a 35 U.S.C. §371 National State Patent Application of International PCT Application Serial No. PCT/EP2013/072813 having an International filing date of 31 Oct. 2013 and that was published on 8 May 2014 under international publication number WO 2014/068059, which claims priority to German Patent Application Serial No. 102012021453.7 that was filed on 31 Oct. 2012. This Application claims priority to and incorporates by reference the above applications in their entirety for all purposes.

The invention relates to an optical rotary transmitter and an associated method for transmitting optical signals.

Such a rotary transmitter is known, for example, from WO 2011/137983 and can be an element of, for example, a rotary coupling or other device having parts that move in rotation and are spatially separated from one another. It enables optical signals to be transmitted unidirectionally or bidirectionally between the relatively rotatable parts, regardless of their rotational position and angular velocity. The wavelength range can extend from long-wave IR radiation to short-wave UV radiation. This is the sense in which the terms "optical" and "light" are to be understood below.

Figure 3:
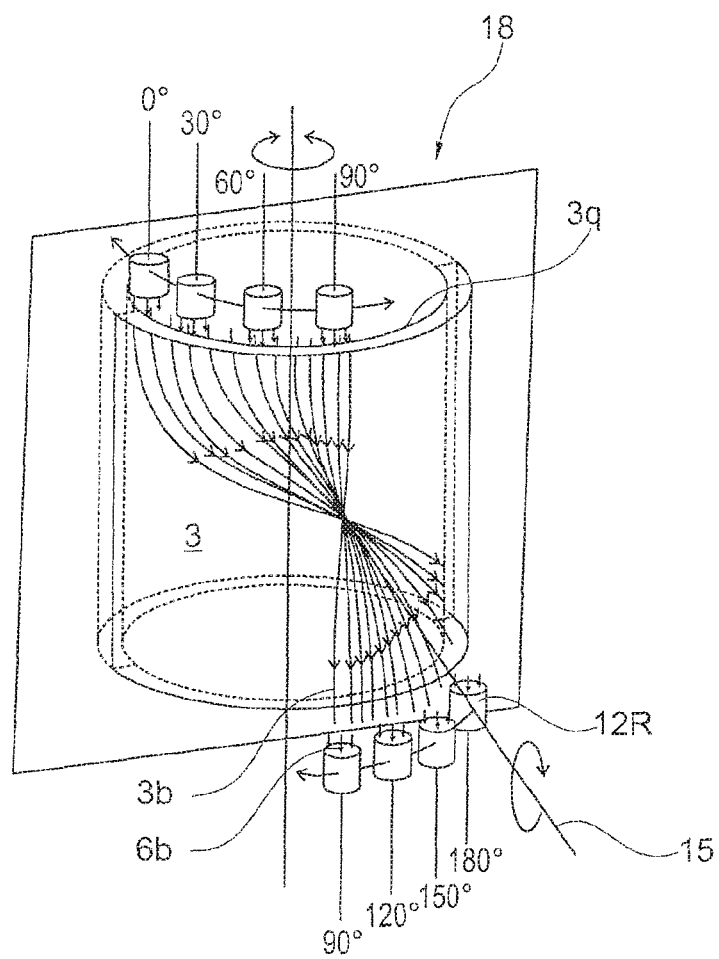

Known from U.S. Pat. No. 4,943,337 is a rotary transmitter by means of which light from an optical transmitter assigned to one of the two relatively rotatable parts is conducted via optical fibers and collimators to an optical coupling component and thence to an optical receiver assigned to the other rotating part. The coupling component serves to derotate the light and rotates at half the angular velocity of the two relatively rotatable parts. This coupling component is illustrated in FIG. 3 to clarify its basic construction without being described in more detail here. The reader is referred to the disclosure of the aforesaid patent.

This rotary transmitter makes it possible to transmit a plurality of channels in parallel, since each light guide of the one rotating part is permanently assigned to a light guide of the other rotating part. Theoretically, therefore, exactly as many channels can be transmitted as light guides are used. Due to crosstalk in adjacent channels, however, the number of channels actually available is usually around half the number of light guides.

The aforesaid published document also discloses the use of collimators to couple the light into the end faces of the light guide. The collimators are arranged along the circumference of the fiber mirror with spaces between them.

One problem with this design is that when the arrangement is rotated, the amplitude of the passed optical signal varies between a maximum that occurs when a light guide of the rotating part is exactly lined up with a light guide in the fiber mirror and a minimum that occurs when the light guide of the rotating part lies exactly between two light guides of the fiber mirror. A signal strength variation of this kind is unacceptable in many transmission tasks.

In addition, it is known from DE 019529527 C1 to give the end portions of the fibers of a light guide a nearly rectangular or square cross section by thermally induced swelling.

All of these known rotary transmitters have the problem of not being able to provide continuous signal transmission with good quality and a high transmission rate while at the same time offering a large amount of free interior space.

The object underlying the invention is to provide a rotary transmitter that is of relatively simple construction and yet ensures the reliable and continuous transmission of a plurality of optical signals simultaneously in physically separate channels between the relatively rotatable parts.

This object is achieved according to toe invention by means of a rotary transmitter as set forth in Claim 1. The dependent claims address further advantageous embodiments of the invention.

The rotary transmitter can operate unidirectionally or bidirectionally. The terms "transmit" and "receive" are therefore mutually interchangeable below.

Owing to its simple and largely symmetrical structure, the rotary transmitter is inexpensive to make and at the same time ensures a high signal transmission reliability that is independent of the angular velocity of the relatively rotatable parts.

The light guides preferably consist of light waveguides in the form of optical fibers, which are usefully gathered into a bundle at their input or output ends. An ordinary optical semiconductor transmitter or receiver can be coupled to the input or output end, either directly or via a concentrator.

Alternatively, but more elaborately, each optical fiber can terminate at a respective assigned transmitting or receiving element. In this case, all the transmitting elements must be driven in parallel and the received signals of the receiving elements must be combined. The higher light transmission power improves the signal-to-noise ratio of the signals on the receiving end.

Figure 1:
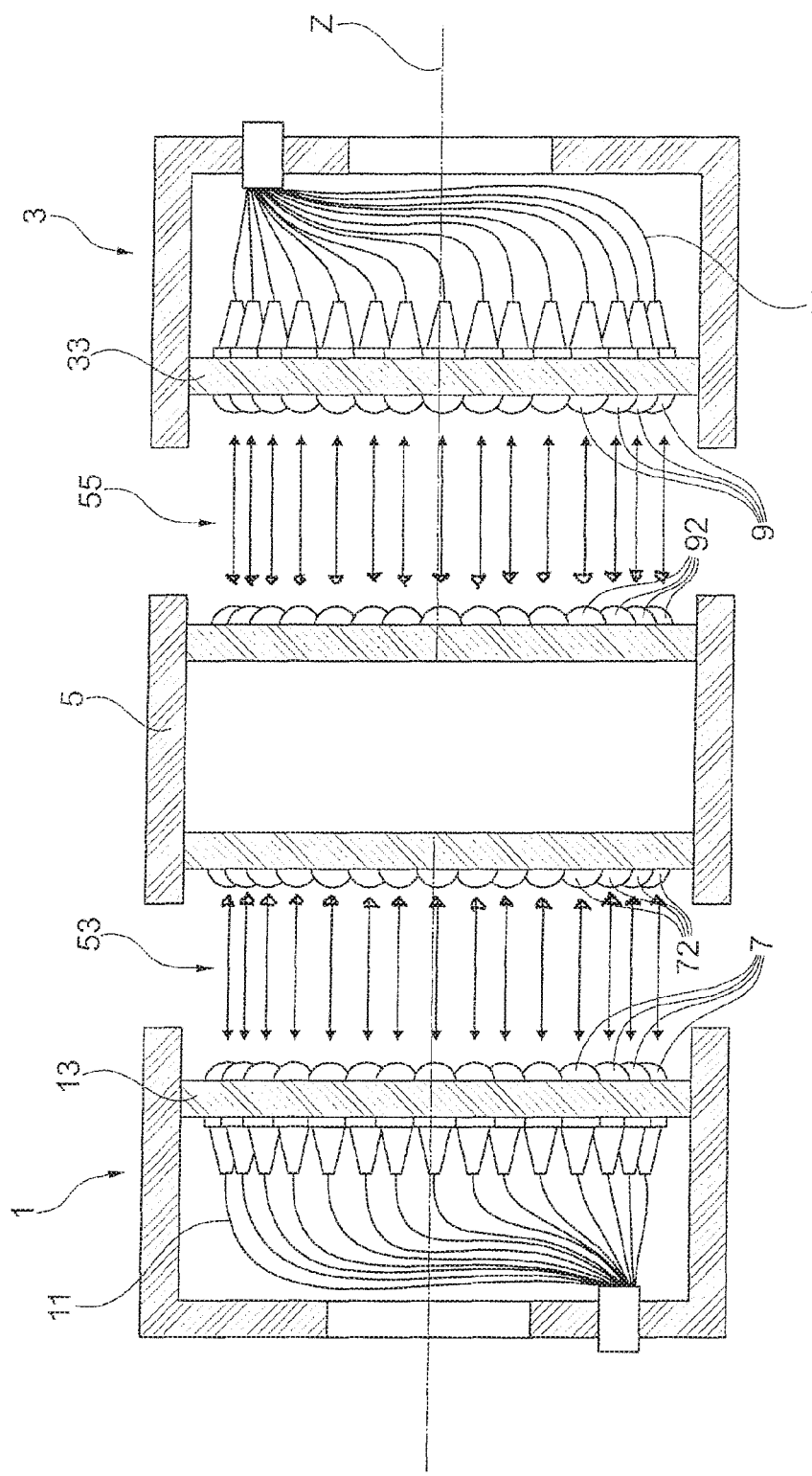
Figure 2:
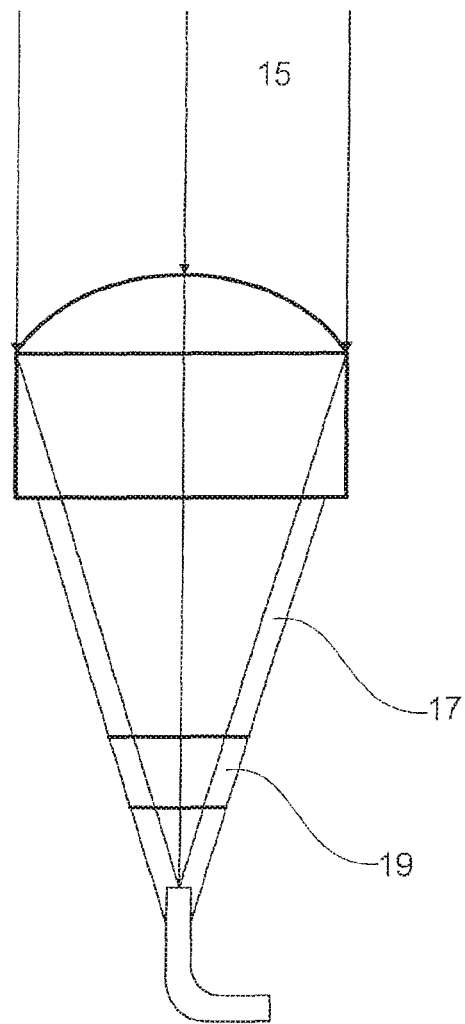
Figure 4:
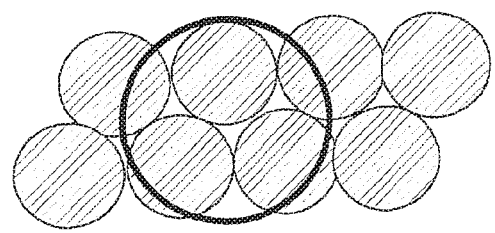

The invention will be described below with reference to the drawing, which depicts schematically simplified exemplary embodiments of the essential parts of the rotary transmitter. Therein:

FIG. 1 shows an optical rotary transmitter according to the invention, comprising a fiber mirror, FIG. 2 shows an exemplary embodiment of a collimator, FIG. 3 is a detailed view of a known fiber mirror from the prior art, to clarify the basic construction of a fiber mirror; and FIG. 4 depicts a preferred arrangement of the end feces of the light guides of a fiber mirror according to the invention.

FIG. 1 shows the essential parts of the rotary transmitter. It comprises a first light coupler 1 and a second light coupler 3. The two light couplers 1, 3 are disposed opposite each other. The first light coupler 1 is assigned to a first part (not shown) of the rotary transmitter, and the second light coupler 3 is assigned to a second part of said rotary transmitter that is able to rotate relative to the first part on a common rotational axis Z.

The first light coupler 1 comprises a plurality of first light guides 11 the end faces 13 of which are designed to transmit optical signals and are arranged in a first ring about the rotational axis Z.

Similarly, the second light coupler 3 comprises a plurality of second light guides 31 the end feces of which are designed to transmit optical signals and are arranged in a second ring about the rotational axis Z.

The first light coupler 1 comprises a first collimator set 7. The second light coupler 3 similarly comprises a second collimator set 9. The first collimator set 7 preferably comprises collimator arrays that are evenly distributed on the circumference of a circle. The second collimator set 9 comprises similarly arranged collimator arrays. The collimator arrays transmit or receive light substantially parallel to the common rotational axis Z. The radiation direction is indicated only exemplarily by the individual arrows in FIG. 1, it being the case here that light coupler 1 is the transmitting light coupler and light coupler 3 the receiving light coupler. This relationship is naturally reciprocal.

Disposed between the two light couplers 1, 3 is a fiber mirror 5. The fiber mirror 5 is designed, in a known manner, to rotate along with the one rotating light coupler 1, 3 at half the rotation speed. The fiber mirror 5 has a plurality of third light guides disposed between the two light couplers 1, 3 and designed to compensate for the effect of a relative rotation between the two light couplers 1, 3 on the transmission of the optical signals, the end faces 53, 55 of the third light guides being designed to transmit optical signals and being arranged in a third and a fourth ring about the rotational axis Z. Such fiber mirrors are known and are described by way of example in U.S. Pat. No. 4,943,137. The light guides and their paths inside the fiber mirror are not illustrated in FIG. 1. The principle, however, is illustrated on the basis of the known fiber mirror in FIG. 3.

The first ring is disposed opposite the third ring, and the second ring is disposed opposite the fourth ring.

The fiber mirror 5 comprises a third collimator set 72 and a fourth collimator set 92. The third and fourth collimator sets 72, 92 comprise collimator arrays evenly and juxtaposedly arranged on the circumference of a circle so as to form, in the third and fourth rings, light inlet/outlet surfaces of the fiber mirror that are substantially gap-free, such that the optical signals can be continuously transmitted without interruption.

The collimator arrays also transmit or receive light substantially parallel to the common rotational axis.

The light guides in the light couplers 1, 3 and in the fiber mirror 5 are preferably optical fibers.

The optical fibers in the light couplers 1, 3 are gathered in each case into a respective bundle, which is then routed to a suitable transmitter or receiver.

The collimator sets 7, 72 and 9, 92, respectively, are designed so that they convert the light signal coupled in via the respective optical fiber to a bundle of parallel rays or couple the received bundle of parallel rays into the associated optical fiber.

The circular or annular shape of the collimator sets 7, 9, 72, 92 leaves an inner diameter of the light couplers 1, 3 and of the fiber mirror 5 unoccupied, thus making it possible to accommodate other, not illustrated parts of the rotary transmitter, for example via bores; e.g., to pass a drive shaft through or dispose rotary bearings (not shown) therein.

FIG. 2 is a merely exemplary rendering of the structure of a collimator array from any of the collimator sets 7, 9, 72, 92, illustrating a centrally connected optical fiber. The collimator array comprises a lens 15 through the image area of which a parallel bundle of rays enters. Adjacent to the lens 15 is a conical body 17 for guiding the light toward a surface, followed by optical concentrators 19 that adapt the diameter and the aperture of the light bundle to the input diameter and the aperture of the respective optical fiber. The optical fiber is connected to the collimator array preferably directly, i.e., without any intervening air space, via a connecting device in the form of a junction and coupling point that is known per se and will not be described in more detail.

The collimator arrays of the light couplers 1, 3 can be arranged spaced apart in the first and second rings. The number of collimator arrays is determined by the number of parallel signal channels to be transmitted. At least one collimator array and one light guide per channel must be provided in each light coupler. Advantageously, a channel is transmitted simultaneously via a plurality of light guides and collimator arrays of the light couplers 1, 3 in order to increase the reliability of transmission.

For instance, it is preferred that the light guides 51 of the fiber mirror 5 be arranged on the respective light inlet/outlet surfaces in relation to the light guides 11, 31 of the light couplers 1, 3 in such a way that whenever at least one light guide of a light coupler 1, 3 is exactly aligned with a light guide 51 of the fiber mirror 5 in order to transmit an optical signal, at least one other light guide of a light coupler 1, 3 is aligned with another light guide 51 of the fiber mirror 5 in a manner offset by a portion of the diameter of the end face of a light guide.

For example, the light guides of the light couplers can be arranged such that when a light guide transmitting a given channel is exactly aligned with a light guide of the fiber mirror, another light guide belonging to the same light coupler and transmitting the same channel is disposed between two light guides of the fiber mirror, such that its signal is distributed to two light guides of the fiber mirror. The fluctuations in the transmission of the channel are reduced in this way. Part of the signal is always absorbed by the jacket surfaces of the receiving light guides.

When the same channel is to be transmitted on three light guides of a light coupler, the arrangement should be such that when one of the light guides of the light coupler is aligned with its counterpart in the fiber mirror, another one trails at an offset of one-third the diameter of the end face of a light guide, whereas the third light guide is offset by $2/3$.

The number of light guides and collimator arrays of each light coupler in this case is a whole multiple of the number of channels. Tests have shown that 150 independent channels can be transmitted without problems.

The collimator arrays on the fiber mirror are configured as adjacent to one another, thereby forming an essentially gap-free light inlet/outlet surface in both the third ring and the fourth ring. Since the combined diameters of the collimator arrays amount to a whole multiple of the diameters of the end faces of the light guides, the number of collimator arrays needed is substantially smaller than when an attempt is made to form the gap-free light inlet/outlet surface of the fiber mirror solely with light guides of circular cross section.

Taking as an example a free inner diameter of 1 m, then, using 1 mm light guides on the fiber mirror and optics with a diameter of 15 mm, the number of light guides in the fiber mirror can be reduced to $1/15$ of the number required in the absence of collimator sets; that is, approximately 200 light guides in the fiber mirror will suffice, instead of the 3000 needed in the current state of the art.

One or two collimator arrays of the fiber mirror will nevertheless always be disposed opposite a collimator array of the light coupler, and thus nearly all of the light for transmission will be passed along.

The structure of the fiber mirror is greatly simplified.

Since the beams coming from each light guide/collimator array are nearly axially parallel, the axial spacing is not a decisive factor with regard to the losses on transition to the light guide/collimator set of the fiber mirror. The case is exactly the same with the transition from the fiber mirror to the output-side light couplers of another advantageous embodiment of the invention [in which] plural coaxial arrays of this kind with increasing diameters are added to increase the number of channels for transmission.

The fiber mirror can basically be made of any desired number of light guides. However, it has proven expedient to design the fiber mirror so that the number of fibers is divisible without remainder by at least 2, or, better, 4.

To keep the number of fibers within acceptable limits with a view toward large free inner diameters, in the embodiment described first herein both the light couplers 2, 3 and the fiber mirror 5 axe equipped with collimator sets, each of which is composed of a plurality of collimator arrays 7, 71, 9, 91, as just described above.

Expediently, each collimator array has a cross-sectional area that does not permit any gaps in the ring of end faces of the assigned light guides. To achieve this, the collimator arrays can also be square or trapezoidal in shape.

To improve the exploitation of the signals transmitted via the fiber mirror by means of collimators, a lens can be used on the receiving side, if such is defined, that has an area equal to that of two lenses of the fiber mirror and also has a focal length matched to this new diameter.

In an alternative embodiment, in addition to or instead of the collimator sets of the fiber mirror, the light guide end faces provided there can be deformed, for example from round to nearly square, for example by thermally induced swelling of the fibers. The effective area for coupling-in can also be optimized in this way.

As an alternative to deformation, it is possible to have each light guide be composed of a bundle of very small-diameter individual fibers and then to shape these individual fibers, at the end face of the light guide, from a circular arrangement to a square or rectangular arrangement.

In a further preferred embodiment, with or without collimator sets at the fiber mirror, two layers of cross-sectionally circular light guides whose diameter is only half that of the supplying light guides can be arranged in a staggered manner. In this way, the surface coverage provided by the incoming and outgoing light guides can be almost the same, thus leading to smaller attenuation differences. This is illustrated by way of example in FIG. 4.

To further improve transmission, it is possible to transmit the same signal on two or more channels of the fiber mirror, in which case the positions of the transmitters should be offset by a portion of the distance between two channels of the fiber mirror.

Although the invention has been described on the basis of preferred embodiments, those skilled in the art will realize that many additional modifications and alterations are feasible. For instance, it is not mandatory that the two light couplers have the same diameter. A difference in diameter can be compensated for by the fiber mirror. It is also possible, in principle, to orient both light couplers in the same direction, for example to incorporate one light guide into the interior of the other. In this case, the light guides of the fiber mirror should be run so that the light enters and exits on the same side.

When the end faces of the deformed light guide are described as rectangular or square, this is not to be understood in the strictly geometrical sense. What is meant here is any deformation of the end faces that makes it possible to form a substantially gap-free surface from the end faces of a plurality of light guides.

The invention claimed is:

1. An optical rotary transmitter for transmitting optical signals, comprising
   a first light coupler (1) having one or a plurality of first light guides (11) the end faces of which are designed to transmit optical signals and are arranged in a first ring about a central rotational axis (Z);
   a second light coupler (3) having one or a plurality of second light guides (31) the end faces of which are designed to transmit optical signals and are arranged in a second ring about a central rotational axis (Z);
   a fiber mirror (5) comprising a plurality of third light guides that are arranged between the two light couplers (1, 3) and are designed to compensate for the effect of a relative rotation between the two light couplers (1, 3) on the transmission of the optical signals, the end faces of the third light guides being designed to transmit optical signals and being arranged in a third and a fourth ring about the central rotational axis (Z);
   characterized in that
   light inlet/outlet surfaces formed by the third and fourth rings are substantially gap-free, such that the optical signals can be continuously transmitted without interruption; further characterized in that
   the end portions of the third light guides fill the areas of the third and fourth rings in two staggered rows, the cross section diameter of the third light guides being half the cross section diameter of the first and/or second light guides.

2. The optical rotary transmitter as in claim 1, characterized in that
   the first and second light couplers (1, 3) comprise a number of collimator arrays arranged such that their focal point falls on the end face of a light guide; and
   light inlet/outlet surfaces of the third and fourth rings of the fiber mirror are formed by a plurality of additional collimator arrays, wherein the end face of a respective light guide of the fiber mirror lies within the focal point of each collimator array of the fiber mirror.

3. The optical rotary transmitter as in claim 2, characterized in that the number of light guides of the fiber mirror is divisible without remainder by two.

4. The optical rotary transmitter as in claim 2, characterized in that the number of light guides of the fiber mirror is divisible without remainder by four.

5. The optical rotary transmitter as in claim 1, characterized in that
   the end portions of the third light guides (51) are designed so that their end faces form a substantially gap-free surface in the third and fourth rings.

6. The optical rotary transmitter as in claim 5, characterized in that
   the end portions of the third light guides are formed of a bundle of thin individual fibers.

7. The optical rotary transmitter as in claim 6, characterized in that the number of light guides of the fiber mirror is divisible without remainder by two.

8. The optical rotary transmitter as in claim 6, characterized in that the number of light guides of the fiber mirror is divisible without remainder by four.

9. The optical rotary transmitter as in claim 5, characterized in that the number of light guides of the fiber mirror is divisible without remainder by two.

10. The optical rotary transmitter as in claim 5, characterized in that the number of light guides of the fiber mirror is divisible without remainder by four.

11. The optical rotary transmitter as in claim 1, characterized in that the number of light guides of the fiber mirror is divisible without remainder by two.

12. The optical rotary transmitter as in claim 11, characterized in that
   the light guides (51) of the fiber mirror (5) are arranged on the respective light inlet/outlet surfaces in relation to the light guides (11, 31) of the light couplers (1, 3) in such a way that whenever at least one light guide of a light coupler (1, 3) is exactly aligned with a light guide (51) of the fiber mirror (5) in order to transmit an optical signal, at least one other light guide of a light coupler (1, 3) is aligned with another light guide (51) of the fiber mirror (5) in a manner offset by a portion of the diameter of the end face of a light guide.

13. The optical rotary transmitter as in claim 11, characterized in that the number of light guides of the fiber mirror is divisible without remainder by four.

14. The optical rotary transmitter as in claim 1, characterized in that the number of light guides of the fiber mirror is divisible without remainder by four.

15. An optical rotary transmitter for transmitting optical signals, comprising
- a first light coupler (1) having one or a plurality of first light guides (11) the end faces of which are designed to transmit optical signals and are arranged in a first ring about a central rotational axis (Z);
- a second light coupler (3) having one or a plurality of second light guides (31) the end faces of which are designed to transmit optical signals and are arranged in a second ring about a central rotational axis (Z);
- a fiber mirror (5) comprising a plurality of third light guides that are arranged between the two light couplers (1, 3) and are designed to compensate for the effect of a relative rotation between the two light couplers (1, 3) on the transmission of the optical signals, the end faces of the third light guides being designed to transmit optical signals and being arranged in a third and a fourth ring about the central rotational axis (Z);

characterized in that light inlet/outlet surfaces formed by the third and fourth rings are substantially gap-free, such that the optical signals can be continuously transmitted without interruption;

further characterized in that the end portions of the third light guides (51) are designed so that their end faces form a substantially gap-free surface in the third and fourth rings;

wherein the end portions of the third light guides fill the areas of the third and fourth rings in two staggered rows, the cross section diameter of the third light guides being half the cross section diameter of the first and/or second light guides; and further wherein the number of light guides of the fiber mirror is divisible without remainder by two.

16. An optical rotary transmitter for transmitting optical signals, comprising
- a first light coupler (1) having one or a plurality of first light guides (11) the end faces of which are designed to transmit optical signals and are arranged in a first ring about a central rotational axis (Z);
- a second light coupler (3) having one or a plurality of second light guides (31) the end faces of which are designed to transmit optical signals and are arranged in a second ring about a central rotational axis (Z);
- a fiber mirror (5) comprising a plurality of third light guides that are arranged between the two light couplers (1, 3) and are designed to compensate for the effect of a relative rotation between the two light couplers (1, 3) on the transmission of the optical signals, the end faces of the third light guides being designed to transmit optical signals and being arranged in a third and a fourth ring about the central rotational axis (Z);

characterized in that light inlet/outlet surfaces formed by the third and fourth rings are substantially gap-free, such that the optical signals can be continuously transmitted without interruption;

further characterized in that the end portions of the third light guides (51) are designed so that their end faces form a substantially gap-free surface in the third and fourth rings;

wherein the end portions of the third light guides fill the areas of the third and fourth rings in two staggered rows, the cross section of the third light guides being half the cross section of the first and/or second light guides; and further wherein the number of light guides of the fiber mirror is divisible without remainder by four.

\* \* \* \* \*